(12) United States Patent
Suyama et al.

(10) Patent No.: US 12,209,551 B2
(45) Date of Patent: Jan. 28, 2025

(54) FRICTION LOSS-REDUCED PISTON FOR AN INTERNAL COMBUSTION ENGINE

(71) Applicant: KS Kolbenschmidt GmbH, Neckarsulm (DE)

(72) Inventors: Satoru Suyama, Neckarsulm (DE); Yasuo Takashima, Neckarsulm (DE); Yoshie Nonaka, Neckarsulm (DE); Takumi Yamamoto, Neckarsulm (DE)

(73) Assignee: KS Kolbenschmidt GmbH, Neckarsulm (DE)

( * ) Notice: Subject to any disclaimer, the term of this patent is extended or adjusted under 35 U.S.C. 154(b) by 171 days.

(21) Appl. No.: 17/627,990

(22) PCT Filed: Jul. 20, 2020

(86) PCT No.: PCT/EP2020/070437
§ 371 (c)(1),
(2) Date: Jan. 18, 2022

(87) PCT Pub. No.: WO2021/013788
PCT Pub. Date: Jan. 28, 2021

(65) Prior Publication Data
US 2022/0275768 A1    Sep. 1, 2022

(30) Foreign Application Priority Data
Jul. 19, 2019   (DE) .......................... 102019119642.6

(51) Int. Cl.
*F02F 3/02*    (2006.01)
*F02F 3/00*    (2006.01)
*F16J 1/16*    (2006.01)

(52) U.S. Cl.
CPC .................. *F02F 3/02* (2013.01); *F02F 3/00* (2013.01); *F16J 1/16* (2013.01)

(58) Field of Classification Search
CPC ...... F02F 3/00; F02F 3/02; F02F 3/022; F02F 3/027; F02F 3/0076; F16J 1/001; F16J 1/04; F16J 1/16
See application file for complete search history.

(56) References Cited

U.S. PATENT DOCUMENTS 6,357,341 B1 *  3/2002  Watanabe .................. F02F 3/00
                                                        123/193.6
7,954,421 B2     6/2011  Buschbeck et al.
(Continued)

FOREIGN PATENT DOCUMENTS

CN     108757205 A    11/2018
CN     208486950 U    2/2019
(Continued)

*Primary Examiner* — Dustin T Nguyen
(74) *Attorney, Agent, or Firm* — Young Basile Hanlon & MacFarlane, P.C.

(57) ABSTRACT

A piston for an internal combustion engine, said piston having an upper piston portion (1) in which a ring zone (2) is located, and a piston lower part (3) having two opposing, load-carrying skirt wall sections (4,5) on the pressure- and counter-pressure sides of the piston adjoins the upper piston portion (1), and the two load-carrying skirt wall sections (4,5) are interconnected via connecting walls (6,7) that are recessed relative to the outer diameter of the piston. Each connecting wall (6, 7) includes a pin bore having a pin bore axis (18) for receiving a pin. The two opposing, load-carrying wall sections (4, 5) have different wall thicknesses and different transition regions at the transition of their lateral skirt connections (8,9 and 16,17) to the recessed connection walls (6,7).

12 Claims, 5 Drawing Sheets

(56) References Cited

U.S. PATENT DOCUMENTS

| | | | |
|---|---|---|---|
| 8,220,432 B2 * | 7/2012 | Iwata | F02F 3/00 |
| | | | 123/193.6 |
| 8,899,194 B2 * | 12/2014 | Engel | F02M 35/108 |
| | | | 123/73 FA |
| 10,087,881 B2 * | 10/2018 | Miller | F02F 3/0084 |
| 10,655,561 B2 * | 5/2020 | Adelmann | F01P 3/10 |
| 10,823,109 B2 * | 11/2020 | Lormes | F02F 3/02 |
| 10,871,125 B2 | 12/2020 | Laqua | |
| 11,162,453 B2 | 11/2021 | Lormes et al. | |
| 2008/0264376 A1 * | 10/2008 | Braig | F02F 3/027 |
| | | | 123/193.6 |
| 2015/0027401 A1 | 1/2015 | Gniesmer | |
| 2017/0051703 A1 | 2/2017 | Lormes et al. | |
| 2020/0072158 A1 | 3/2020 | Muller et al. | |

FOREIGN PATENT DOCUMENTS

| | | |
|---|---|---|
| DE | 19832091 A1 | 1/1999 |
| DE | 102007031581 A1 | 1/2009 |
| DE | 102017108271 A1 | 11/2017 |
| EP | 0563408 A1 | 10/1993 |
| JP | H0299245 U | 8/1990 |
| JP | 2002317691 A | 10/2002 |
| JP | 2018044482 A | 3/2018 |
| WO | 2017025608 A1 | 2/2017 |

* cited by examiner

FRICTION LOSS-REDUCED PISTON FOR AN INTERNAL COMBUSTION ENGINE

CROSS-REFERENCE TO RELATED APPLICATIONS

This application is filed under 35 USC 371 and claims priority benefit to PCT patent application PCT/EP2020/070437 filed Jul. 20, 2020, which claims priority benefit to German patent application no. DE 10 2019 119 642.6 filed Jul. 19, 2019, the entire contents of both applications incorporated herein by reference.

TECHNICAL FIELD

The invention relates to a piston for an internal combustion engine, which piston is designed in a so-called box design.

BACKGROUND

Modern piston systems are subject to demanding requirements in terms of their durability and also their operational performance. In addition, there is the environmental requirement for low emissions output from the engines.

For this purpose, pistons are known, e.g., DE 10 2017 108 271 A1, that have opposing supporting skirt wall sections with which the piston is supported on the cylinder inner wall during its movement in the cylinder of the internal combustion engine and slides along the latter. The two opposing supporting skirt wall sections are interconnected via connecting walls that are set back relative to the outer diameter (also referred to as nominal diameter) of the piston. The two set-back connecting walls are each penetrated by a pin bore receiving a pin in a manner known per se. The supporting skirt wall sections have the same thickness (wall thickness) in their radial direction (between the transition area where the side region of each supporting skirt wall section transitions into its associated connecting wall). In addition, the opposing supporting skirt wall sections have the same design on the pressure side and the counter pressure side. Similarly, the set-back connecting walls also have the same thickness (wall thickness). Furthermore, the skirt wall sections are at least partially separated from the upper piston portion by slots.

To satisfy the requirements described at the beginning, the connecting walls of such pistons in box design are known to be slanted and, depending on the geometry and intended use of the piston, to run parallel, concave or convex to a piston stroke axis. This reduces the friction within the piston system (piston and cylinder of the internal combustion engine) and satisfies stringent requirements in terms of fuel consumption, emissions, noise and service life.

SUMMARY

In view of this, it is the object of the invention to further improve the piston system, in particular the piston, with regard to the requirements described above.

This object is achieved in that the two opposing supporting skirt wall sections comprise different transition areas at the transition of their lateral skirt connections to the set-back connecting walls.

This feature may be complemented in that either the two opposing supporting skirt wall sections comprise wall thicknesses that are different from each other or the two opposing supporting skirt wall sections comprise equal wall thicknesses.

This improved piston achieves better contact with the cylinder bearing surface through the effects of skirt rigidity and even further optimized piston profiles. Since the pressure and counter pressure sides have different boundary conditions for engine operation, they are treated differently due to the different wall thicknesses and connections of the supporting skirt wall sections in the transition area in the direction of the set-back connecting walls. Important advantages are the combination of flexibility, which makes it possible to achieve better contact, and improved rigidity, which is required for the long-term durability of the piston. Better contact with the cylinder bearing surface results in a reduction of the friction loss on the piston skirt (the supporting skirt wall sections) of up to twenty percent, which also improves fuel efficiency.

The basic idea of this invention, namely that the two opposing supporting skirt wall sections comprise wall thicknesses that are different from each other as well as different transition areas at the transition of their lateral skirt connections to the set-back skirt walls, is explained and described in more detail below with reference to an exemplary embodiment of a piston.

BRIEF DESCRIPTION OF THE DRAWINGS

An exemplary embodiment of the invention is shown in simplified form in the drawings. In the drawings.

DETAILED DESCRIPTION

The exemplary embodiment is based on a piston of an internal combustion engine, said piston comprising an upper piston portion 1 (piston top), in which the ring zone 2 is located, wherein, starting at the upper piston portion 1, two opposing supporting skirt wall sections 4 (pressure side), 5 (counter pressure side) are provided and the two supporting skirt wall sections are interconnected via connecting walls 6, 7 that are set back relative to the outer diameter of the piston, wherein each connecting wall is provided with a pin bore for receiving a pin. Such a piston can be manufactured in a number of ways (for example, by casting, forging, or the like). It can be manufactured from one single part or consist of two (for example, top part and bottom part) or even of more than two parts, which are interconnected in a suitable manner, in particular, by means of a non-detachable joining process, such as welding or the like.

Figure 1:
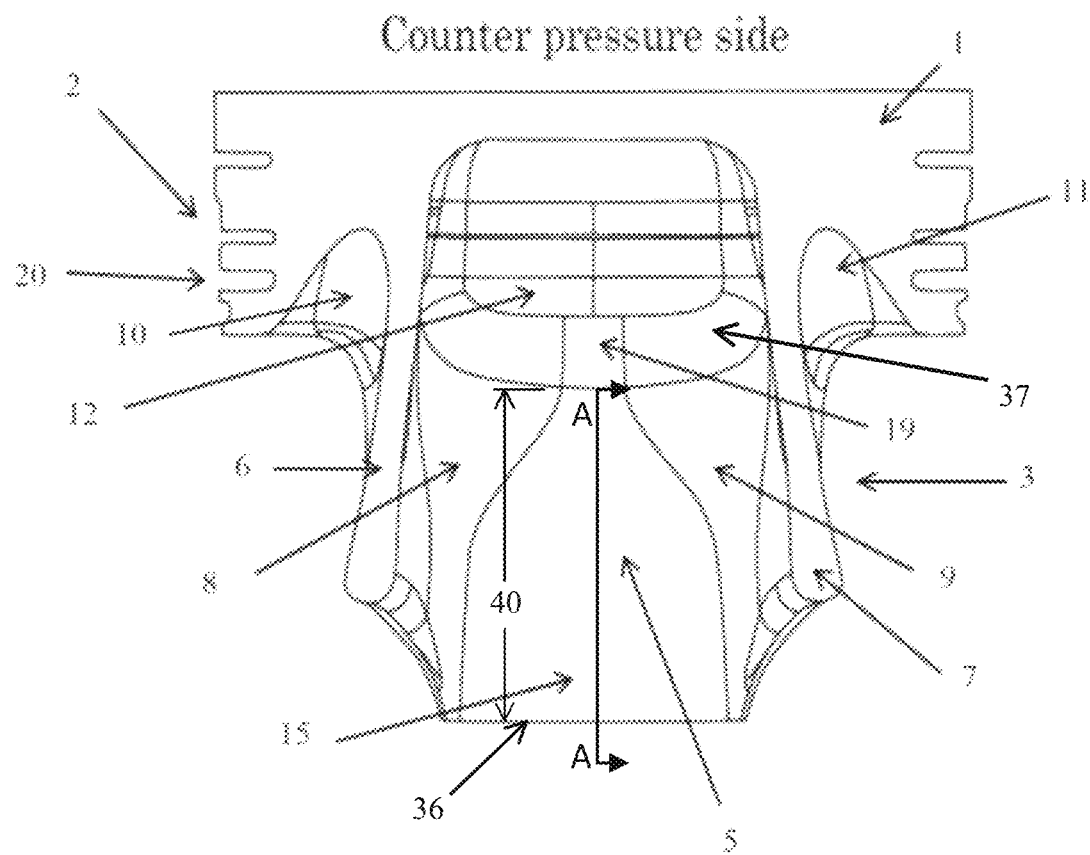
FIG. 1 is a cross sectional view of one example of the piston invention depicting the counter pressure side of the piston.
Figure 2:
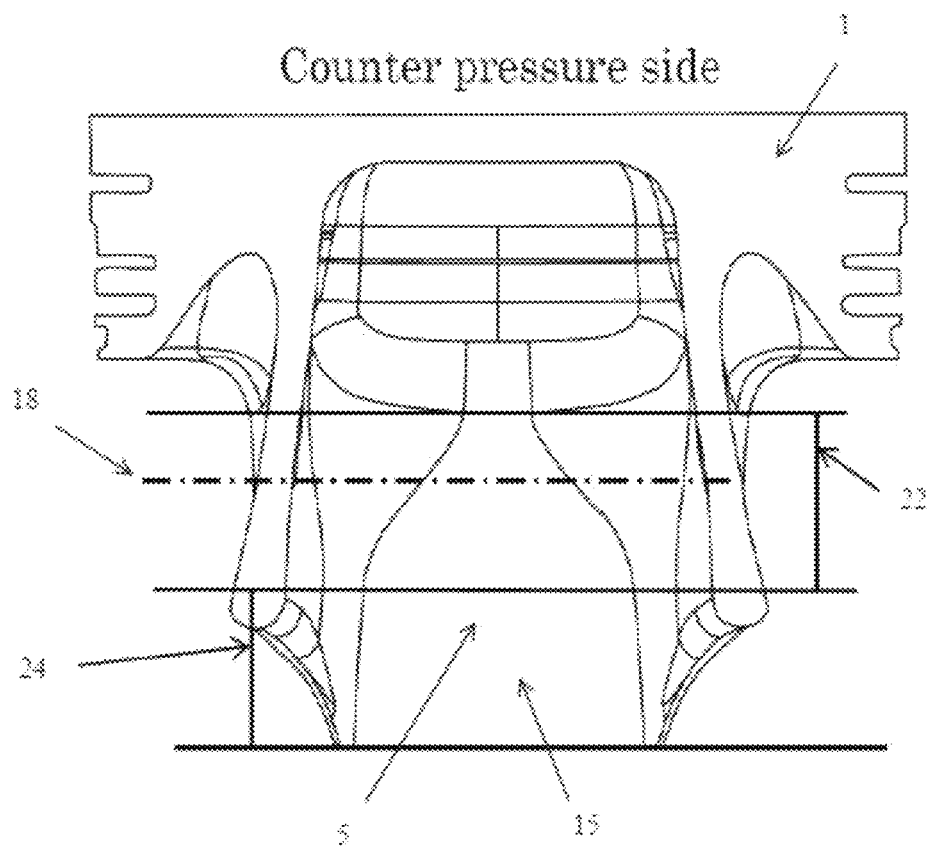
FIG. 2 is an alternate view of the cross sectional view of the piston shown in FIG. 1.
Figure 3:
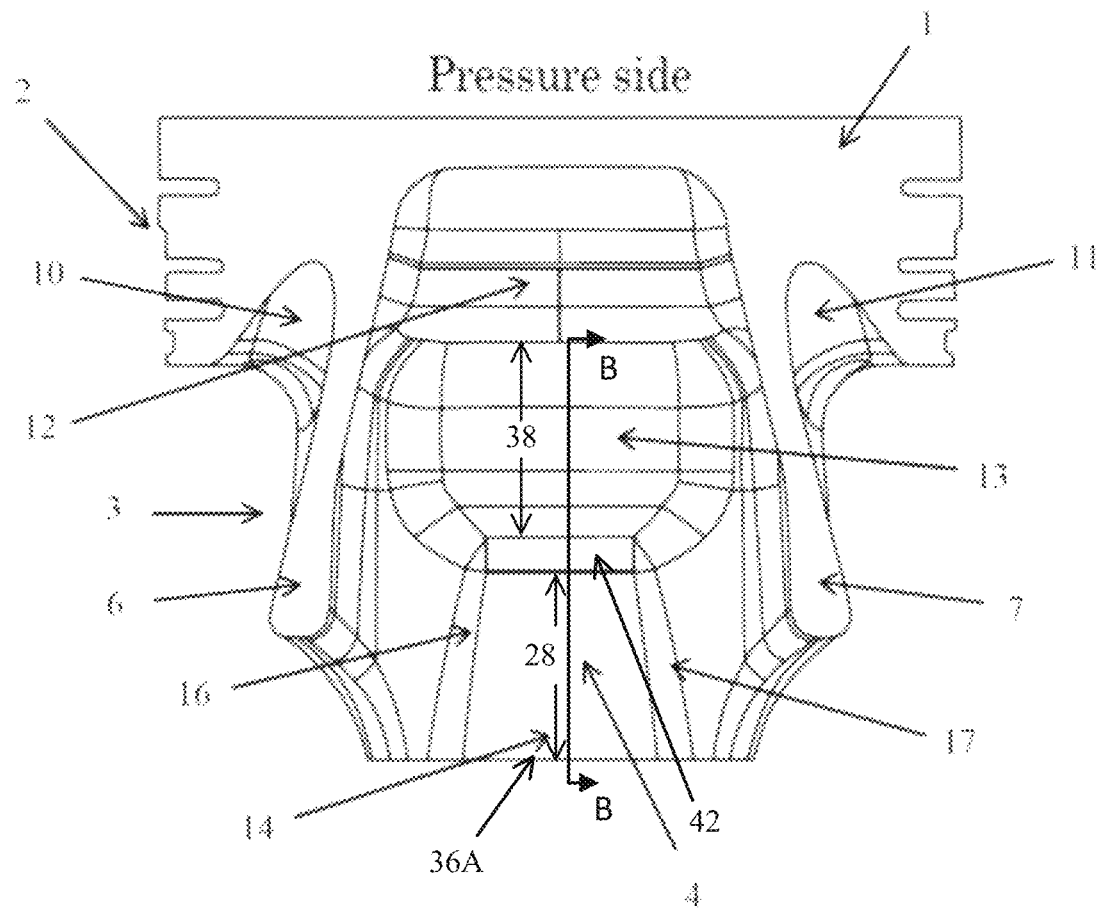
FIG. 3 is a cross sectional view of one example of the piston invention of FIG. 1 depicting the pressure side of the piston.

FIGS. 1 and 2 show a cross section of a piston according to the invention, providing a view into the interior of the piston depicting the counter pressure side of the piston. The cross section is in an area between a supporting skirt wall section with the reference sign 5 and the pin bore, in FIG. 2 this pin bore is shown as an outline. Thus, when viewing FIGS. 1 and 2, the inside area of the supporting skirt wall section 5 on the counter pressure side is viewed from the direction of the piston pin. Incidentally, the same also applies to the cross section shown in FIGS. 3 and 4, in which the inside area of the supporting skirt wall section 4 on the pressure side is viewed from the direction of the piston pin.

Figure 5A:
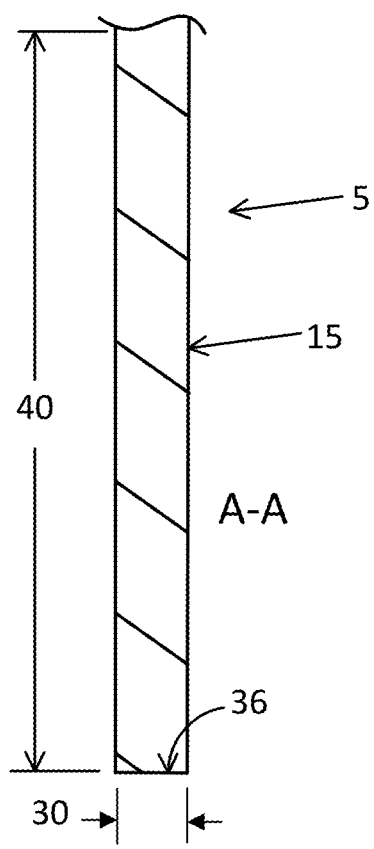
FIG. 5A is an enlarged cross-sectional view taken along line A-A in FIG. 1.

The internal view of the piston according to both FIGS. 1 and 2 relates to the counter pressure side. A central skirt region with the reference sign 15 can be seen, which is part of the supporting skirt wall section 5. As best seen in the example shown in FIGS. 1 and 5A, the central skirt region 15 has an invariable wall thickness 30 in the range of 1% to 3% of the nominal diameter (DN) of the piston. The lateral areas of this central skirt region 15 transition into lateral skirt connections 8 and 9. The skirt connections 8 and 9 are rounded (curved) and connect to the set-back connecting walls 6 and 7. In an upper area 19 of the respective supporting skirt wall section 5 said skirt wall section is joined to or transitions into the upper piston portion 1, also in a rounded (curved) manner. The upper area 19 transition takes place via a connection to a ring zone bulge 12. The ring zone bulge 12 is located at the level of a ring zone 2, in particular approximately at the level of the lowest (or bottom) ring groove 20. This connection can be seen very clearly in FIG. 1. In the FIGS. 1 and 2 example, the central skirt region 15 extends from the skirt wall section 5 lower edge 36 to the connection radius 37 of the ring zone bulge 12 defining a central skirt region axial length 40. In one example, the central skirt region 15 has an invariable wall thickness of 1-3% of the nominal diameter of the piston.

FIG. 2 schematically shows the height or position of a pin bore axis 18 of a pin bore extending in a dash-dotted plane. In relation to this, an area 22 with an increasing connection radius of 14% to 20% of the nominal diameter of the piston is provided (height 14-20% of DN), with an area 24 with an invariable connection radius of 9% to 15% of the nominal diameter of the piston (height 9-15% of DN) following below this area 22 of the increasing connection radius. In one example, the area of increasing connection radius 22 is from 5-8% to 15-20% of the nominal diameter of the piston. In another example, the invariable connection radius for area 24 is 5-8% of the nominal diameter of the piston (below the pin bore axis 18).

Analogous to FIGS. 1 and 2, FIGS. 3 and 4 show a view of the interior of the piston on the pressure side. Here, it can be seen that the supporting skirt wall section 4 has a lower central skirt region 14 that transitions into the set-back connecting walls 6 and 7 in a rounded (curved) manner via a respective lateral skirt connection 16 and 17. As best seen in the example shown in FIGS. 3 and 5B, the lower central skirt region 14 has an invariable wall thickness 32 of 1% to 3% of the nominal diameter of the piston. The lower central skirt region 14 extends from a lower edge 36A including an upper end of the lower central skirt region 14 defining a height 28 and transitions into an upper central skirt region 13 via a rounded (curved) area 42. The upper central skirt region 13 extends axially from the rounded area 42 to the ring zone bulge 12 defining a height 38 of the upper central skirt region 13. The upper central skirt region 13 has an invariable wall thickness 34 of 2.5% to 6% of the nominal diameter of the piston. Thus, there are two central skirt regions 13 (upper) and 14 (lower) on the pressure side of the piston, which have different wall thicknesses. In contrast, there is only one central skirt region 15 with an invariable uniform wall thickness on the counter pressure side of the piston. The upper end of the upper central skirt region 13 again transitions via the ring zone bulge 12 into the upper piston portion 1 of the piston. In one example, the lateral skirt connection 16, 17 has an invariable radius of 9-17% of the nominal diameter of the piston.

Figure 4:
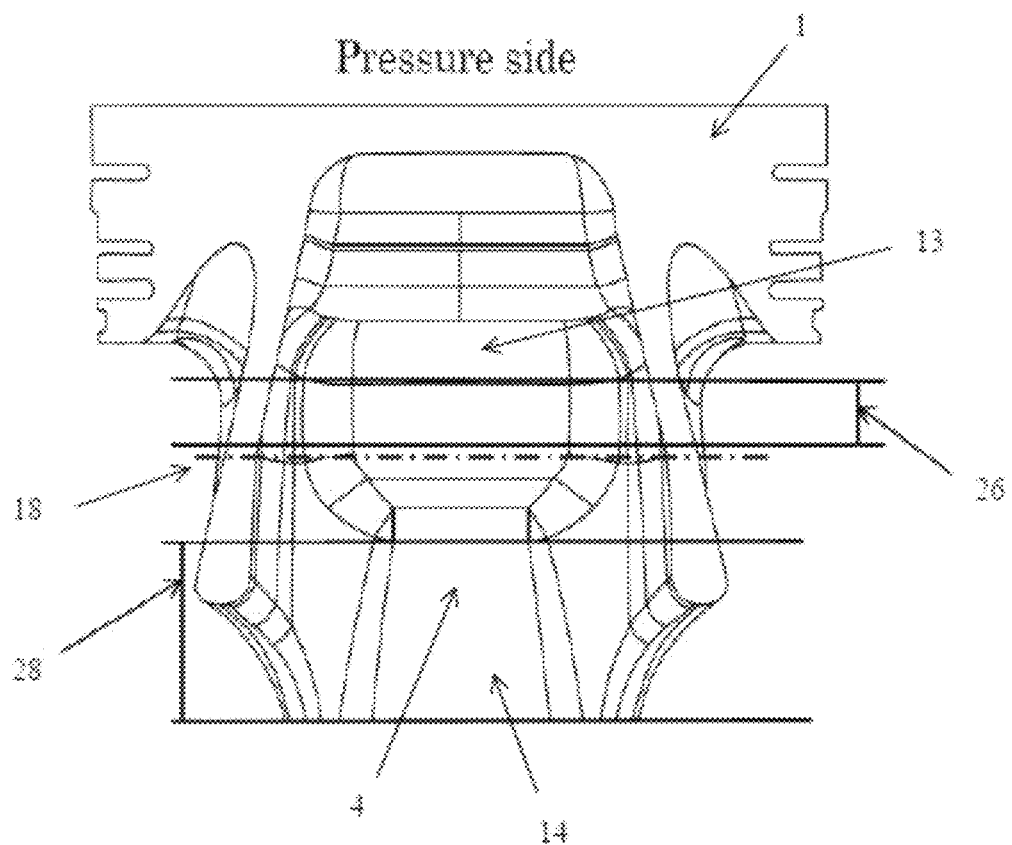
FIG. 4 is an alternate view of the cross sectional view of the piston shown in FIG. 3.
Figure 5B:
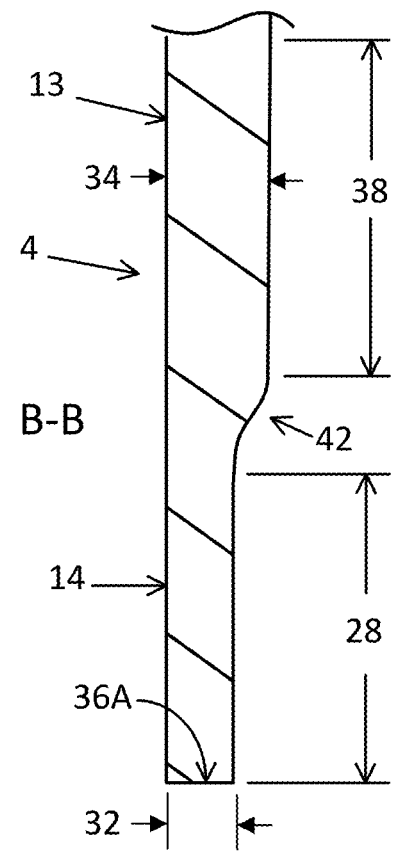
FIG. 5B is an enlarged cross-sectional view taken along line B-B in FIG. 3.

FIG. 4 again shows the dash-dotted plane in which the position or height of the longitudinal pin bore axis 18 of the pin bore is located. An upper end portion of the upper central skirt region 13 is located above this plane so that a lower end portion of the upper central skirt region 13, in which it has the invariable wall thickness, starts below this plane. A height 26 of an area of the upper end portion of the upper central skirt region 13 is 4% to 9% of the nominal diameter of the piston. The lower central skirt region 14 has a height 28 of an area of 11% to 19% of the nominal diameter of the piston. In one example, the area lower central skirt region 28 is located 90-100% below the pin bore axis 18. In another example, the upper central skirt region 26 is located 80-100% above the pin bore axis 18. An exemplary embodiment according to FIG. 4 shows that the lower end portion of the lower central skirt region 14 also forms the lower edge of the piston.

In principle, the central skirt regions 13, 14, 15 provided in the piston, in particular the single central skirt region 15 on the counter pressure side and, in particular, the two central skirt regions 13 and 14 on the pressure side, have their respective invariable wall thickness (thickness) in their respective area. This respective wall thickness increases progressively with the rounded (curved) transition in the direction of the set-back connecting walls 6, 7 and with the rounded (curved) ring zone bulge 12 in the direction of the upper piston portion 1. This means that both the supporting skirt wall section 5 on the counter pressure side and the supporting skirt wall section 4 on the pressure side have areas of invariable wall thickness and, adjacent to them, areas with increasing wall thickness.

The above percentages may vary upward or downward by 1% or by 5% or by 10% depending on the application of the piston.

LIST OF REFERENCE SIGNS

1. Upper piston portion
2. Ring zone
3. Piston bottom part
4. Skirt wall section (of pressure side)
5. Skirt wall section (of counter pressure side)
6. Connecting wall
7. Connecting wall
8. Lateral skirt connection
9. Lateral skirt connection
10. Undercut
11. Undercut
12. Ring zone bulge
13. Upper, central skirt region (of pressure side)
14. Lower, central skirt region (of pressure side)
15. Central skirt region (of counter pressure side)
16. Lateral skirt connection
17. Lateral skirt connection
18. Pin bore axis
19. Connection to ring zone bulge (of counter pressure side)
20. Bottom/lowest ring groove
22. Area of increasing connection radius (Height 14-20% DN) (of counter pressure side)
24. Area of invariable connection radius (Heights 9-15% DN) (of counter pressure side)

26. Area upper central skirt region (Height 4-9% DN) (of pressure side)
28. Area lower central skirt region (Height 11-19% DN)
30. Wall thickness of central skirt region (counter pressure side)
32. Wall thickness of the lower central skirt region (pressure side)
34. Wall thickness of the upper central skirt region (pressure side)
36. Skirt wall section lower edge
37. Connection radius of the ring zone bulge (counter pressure side)
38. Height of upper central skirt region (pressure side)
42. Rounded (curved) area

What is claimed is:

1. A piston of an internal combustion engine, comprising an upper piston portion (1) in which a ring zone (2) is located, wherein, starting at the upper piston portion (1), a piston bottom part (3) with two opposing skirt wall sections (4, 5) is respectively provided on a pressure and a counter pressure side of the piston, and the two opposing skirt wall sections (4, 5) are interconnected via connecting walls (6, 7) that are set back relative to an outer diameter of the piston, wherein in each connecting wall (6 and 7) a pin bore having a pin bore axis for receiving a pin is provided, wherein the two opposing skirt wall sections (4 and 5) comprise different transition areas at a transition of their lateral skirt connections (8, 9 and 16, 17) to the connecting walls (6, 7), wherein the skirt wall section (5) of the counter pressure side comprises a central skirt region (15) extending all the way to a ring zone bulge (12), wherein the central skirt region (15) tapers in a direction toward the upper piston portion (1), wherein the lateral skirt connections (8, 9) on the counter pressure side are configured to coordinate with the taper of the central skirt region (15), and wherein the central skirt region (15) comprises a constant wall thickness (30), the skirt wall section (4) of the pressure side further comprises:

two central skirt regions including an upper central skirt region (13) adjacent to the ring zone bulge (12) and a lower central skirt region (14) positioned distant from the ring zone bulge (12), to which the lateral skirt connections (16, 17) on the pressure side are laterally adjoined, wherein the upper central skirt region (13) extends from the ring zone bulge (12) past a center of the pin bore axis (18) toward the lower central skirt region (14) and has a wall thickness (34) that is constant along an entire height (38) of the upper central skirt region (13) and the lower central skirt region (14) has a constant wall thickness (32) along an entire height (28) of the lower central skirt region (14), wherein the constant wall thickness (34) of the upper central skirt region (13) is different than the constant wall thickness (32) of the lower central skirt region (14).

2. The piston according to claim 1, wherein the two opposing skirt wall sections (4 and 5) wall thicknesses are different from each other.

3. The piston according to claim 2, further defining undercuts (10, 11) projecting into the upper piston portion (1) are incorporated on an outside of the connecting walls (6, 7) and comprise arcuate cross sections.

4. The piston according to claim 2, wherein the ring zone bulge (12) defines a cavity, the ring zone bulge extending into the upper piston portion (1) and is provided within the skirt wall sections (4 and 5) and the connecting walls (6, 7).

5. The piston according to claim 2, wherein a portion of the upper central skirt region (13) is arranged at the level of the pin bore above the pin bore axis (18) thereof and is designed as a strip.

6. The piston according to claim 1, wherein the ring zone bulge (12) defines a cavity, the ring zone bulge extending into the upper piston portion (1) and is provided within the skirt wall sections (4 and 5) and the connecting walls (6, 7).

7. The piston according to claim 1, wherein a portion of the upper central skirt region (13) is arranged at the level of the pin bore above the pin bore axis (18) thereof and is designed as a strip.

8. The piston according to claim 7, wherein the lower central skirt region (14) extends from a lower edge of the pin bore to a lower edge (36A) of the skirt wall section (4) on the pressure side.

9. The piston according to claim 1, wherein the lower central skirt region (14) extends from a lower edge of the pin bore to a lower edge (36A) of the skirt wall section (4) on the pressure side.

10. The piston of claim 1, wherein the constant wall thickness (34) of the upper central skirt region is 2.5% to 6% of a nominal diameter of the piston, and the constant wall thickness (32) of the lower central skirt region is 1% to 3% of the nominal diameter of the piston.

11. The piston of claim 10, wherein the transition areas of the lateral skirt connections (8, 9) of the counter pressure side further comprises:
    an area (24) of the counter pressure side having a height of 9%-15% of an outer diameter of the piston extends axially upward from a lower edge (36) of the skirt wall section (5) to an upper end, wherein a connection radius of the area (24) between the central skirt region (15) and the respective connecting wall (6, 7) is a value of 5%-8% of the outer diameter of the piston, the connection radius of the area (24) remaining constant along the height of the area (24); and
    an area (22) of the counter pressure side having a height of 14%-20% of the outer diameter of the piston extends axially upward from the upper end of the area (24) to a connection radius (37) of the ring zone bulge (12), wherein a connection radius of the area (22) between the central skirt region (15) and the respective connecting wall (6, 7) increases along the height of the area (22) from a value of 5%-8% of the outer diameter of the piston from the upper end of the area (24) to a value of 15%-20% of the outer diameter of the piston to the connection radius (37) of the ring zone bulge (12).

12. The piston of claim 11, wherein the transition areas of the lateral skirt connections (16, 17) to the connecting walls (6, 7) of the pressure side comprise a connection radius having a value of 9%-17% of the outer diameter of the piston and remains constant.

* * * * *